(12) United States Patent
Blackmore et al.

(10) Patent No.: US 10,571,514 B2
(45) Date of Patent: Feb. 25, 2020

(54) SINGLE SIMULATION-BASED STRUCTURE FUNCTION MAPPING

(71) Applicant: Mentor Graphics Corporation, Wilsonville, OR (US)

(72) Inventors: Byron Blackmore, Dartmouth (CA); Joseph Charles Proulx, New Boston, NH (US); Robin Bornoff, Herefordshire (GB); Andras Vass-Varnai, Seoul (KR)

(73) Assignee: Mentor Graphics Corporation, Wilsonville, OR (US)

( * ) Notice: Subject to any disclaimer, the term of this patent is extended or adjusted under 35 U.S.C. 154(b) by 204 days.

(21) Appl. No.: 15/792,170

(22) Filed: Oct. 24, 2017

(65) Prior Publication Data
US 2019/0072606 A1 Mar. 7, 2019

Related U.S. Application Data

(60) Provisional application No. 62/554,571, filed on Sep. 6, 2017.

(51) Int. Cl.
*G06F 17/50* (2006.01)
*G01R 31/28* (2006.01)
*G01K 7/42* (2006.01)

(52) U.S. Cl.
CPC ........... *G01R 31/2874* (2013.01); *G01K 7/42* (2013.01); *G01K 7/425* (2013.01);
(Continued)

(58) Field of Classification Search
USPC ....................................................... 716/111
See application file for complete search history.

(56) References Cited

U.S. PATENT DOCUMENTS

2008/0235639 A1* 9/2008 Awad ...................... G05F 1/561
716/136
2013/0055178 A1* 2/2013 Malladi ............... G06F 17/5036
716/106

(Continued)

OTHER PUBLICATIONS

R. Bornoff and A. Vass-Varnai: "A Detailed IC Package Numerical Model Calibration Methodology" Semiconductor Thermal Measurement and Management Symposium (SEMI-THERM), 2013, 29th Annual IEEE, pp. 65-70.

(Continued)

*Primary Examiner* — Mohammed Alam (57) ABSTRACT

A thermal transient response simulation is performed for a structure having a plurality of thermal model elements. The thermal transient response simulation determines a relation between transient thermal impedance of the structure and time and a relation between maximum temperature change of each of the thermal model elements and time. An onset time at which energy reaches each of the thermal model elements is determined based on the relation between maximum temperature change of each of the thermal model elements and time and a predetermined maximum temperature change threshold. An influence onset resistance value for each of the thermal model elements is determined by looking up a thermal resistance value corresponding to the onset time based on the relation between transient thermal impedance of the structure and time. A structural function is mapped based on the influence onset resistance value for each of the thermal model elements.

20 Claims, 10 Drawing Sheets

Flow chart 300

(52) U.S. Cl.
CPC ...... *G06F 17/5009* (2013.01); *G06F 17/5031* (2013.01); *G01R 31/2848* (2013.01); *G06F 2217/40* (2013.01); *G06F 2217/78* (2013.01); *G06F 2217/80* (2013.01)

(56) References Cited

U.S. PATENT DOCUMENTS

| | | | | |
|---|---|---|---|---|
| 2014/0324404 | A1* | 10/2014 | de la Torre-Bueno | ............... G06F 17/5009 703/6 |
| 2016/0239589 | A1* | 8/2016 | Blackmore | ......... G06F 17/5009 |
| 2018/0314782 | A1* | 11/2018 | Proulx | ............... G06F 17/5036 |
| 2019/0072606 | A1* | 3/2019 | Blackmore | ........ G01R 31/2874 |

OTHER PUBLICATIONS

A. Vass-Varnai, R. Bornoff, S. Ress, Y. Luo, A. Poppe, G. Farkas, M. Rencz: "Thermal Solutions and Measurements—a Combined Approach for Package Characterization", Therminic 2006.
Y. Luo: "Structure Function Based Thermal Resistance & Thermal Capacitance Measurement for Electronic System", 21st IEEE Semi-Therm Symposium, 2010, pp. 1-5.
JEDEC Standard, JESD51-14, "Transient Dual Interface Test Method for the Measurement of the Thermal Resistance Junction to Case of Semiconductor Devices with Heat Flow Trough a Single Path", Nov. 2010.
Y. Luo: "Use Isothermal Surface to Help Understanding the Spacial Representation of Structure Function", Transactions of the Japan Institute of Electronics Packaging, vol. 5, No. 1, 2012, pp. 62-68.

* cited by examiner

SINGLE SIMULATION-BASED STRUCTURE FUNCTION MAPPING

RELATED APPLICATIONS

This application claims the benefit of U.S. Provisional Patent Application No. 62/554,571, filed on Sep. 6, 2017, and naming Byron Blackmore et al. as inventors, which application is incorporated entirely herein by reference.

FIELD OF THE DISCLOSED TECHNOLOGY

The present disclosed technology is directed to the thermal analysis. Various aspects of the disclosed technology may be particularly useful for calibrating thermal models for circuit packages.

BACKGROUND OF THE DISCLOSED TECHNOLOGY

High operating temperatures can severely affect the performance, power consumption and reliability of a circuit system. With the continued scaling of integrated circuit technologies, high power density and the resulting difficulties in managing temperatures have become a major challenge for designers at all design levels. Historically, temperature sensors such as thermal couples have been used to measure the thermal resistance of electronic packages for thermal characterization. The measurement result is, however, prone to errors and not sufficiently reproducible. One problem is a potential temperature distribution at the package case while the thermocouple measures the temperature just at its contact point to the case. Another problem is that thermocouple bead is often not sufficiently insulated against the cold plate and could therefore be cooled from the wire and cold plate side. The interface thermal resistance between the case and the thermocouple may also play a role. A further issue with thermocouples is that they cannot measure the temperature of the internal structure, yet by design the dominant heat flow path is from the junction, through many materials and material interfaces before passing into a PCB or heat sink. Thermocouples are therefore a "blunt instrument" when it comes to thermal design verification.

The thermal transient measurement technique has been introduced to overcome the disadvantages of the direct temperature measurement. In a thermal transient measurement, a step power is applied to a structure of interest and the response of the structure is recorded and analyzed. For example, an electronic package containing a bipolar junction transistor is powered to a certain power value and left until it reaches a steady state condition. The package is then powered off and the resulting junction temperature response is measured using a specialized tool such as the commercial T3Ster® system available from Mentor Graphics Corporation of Wilsonville, Oreg. The thermal transient measurement can generates a curve of normalized transient thermal impedance (Zth) with the transient thermal impedance being calculated from the temperature change in time.

The Zth curve is in time domain and does not show structural information. It has been demonstrated that a thermal system can be treated as a distributed thermal RC (resistance-capacitance) network. Thermal resistance and thermal capacitance of thermal model elements on the heat flow path determine step power response of the system. The Zth curve can be converted to a structure function (also referred to as cumulative structure function or thermal structure function) showing cumulative thermal capacitance as a function of the cumulative thermal resistance. The structure function can be divided into parts or portions corresponding to layers of the thermal model elements on the heat flow path. This allows the identification of partial thermal resistances and partial thermal capacitances on the heat flow path not only inside the device package like die attach, but also outside electronic components such as PCB board, surface-air boundary layer, and contact thermal resistance. It can also help with calibrating the thermal model for thermal transient response simulations.

It is not trivial to determine which part of the structure function corresponds to which thermal model element, however. Several conventional approaches all have their own advantages and disadvantages.

The first one is based on isothermal surfaces. Knowing the resistance value that a structure function feature occurs at, one can determine the temperature value at which this resistance relates to (Tj-(Resistance/Power)). Those objects that are bisected by the simulated iso-surface of that temperature, and carry the majority of the heat flow in the steady state power on condition, are those that may be responsible for that resistance. This would be a reliable approach if the temperature variation at the object interface into which heat flows had a uniform temperature. In many parts of a package model this is not the case and so such an approach does not always indicate correctly which objects correlate to which structure function resistances.

An alternative approach is to note that time at which the resistance in question "occurs at" then to study the simulated heat flux distribution at that time point. The fore front of the heat flux field (using the "power on" approach to determine the thermal impedance curve) should be experiencing the object that is responsible for that resistance, at that time. If the resistances that are apparent on the structure function are sensed at one point in time then again, this would be a reliable approach. However the structure function resistances are built up as heat starts to pass through the object, soaks into it then passes through it.

A more full-proof approach is to make perturbations to the numerical model at known locations and compare how these relate to differences in resulting structure functions. More reliable as is, the perturbation method is a computationally expensive approach.

BRIEF SUMMARY OF THE DISCLOSED TECHNOLOGY

Aspects of the disclosed technology relate to techniques for mapping thermal model elements to a structure function based on a single simulation. In one aspect, there is a method, executed by at least one processor of a computer, comprising: performing a thermal transient response simulation for a structure having a plurality of thermal model elements, a heat flow path in the structure passing through layers of the thermal model elements, the thermal transient response simulation determining a relation between transient thermal impedance of the structure and time and a relation between maximum temperature change of each of the thermal model elements and time; determining an onset time at which energy reaches each of the thermal model elements based on the relation between maximum temperature change of each of the thermal model elements and time and a predetermined maximum temperature change threshold; and determining an influence onset resistance value for each of the thermal model elements by looking up a thermal resistance value corresponding to the onset time based on the relation between transient thermal impedance of the structure and time.

The method may further comprise: associating portions of a structural function with the thermal model elements based on the influence onset resistance value for each of the thermal model elements, the structural function being determined by the thermal transient response simulation. Alternatively or additionally, the method may further comprise: calibrating a thermal model of the structure used by the thermal transient response simulation based on the influence onset resistance value for each of the thermal model elements and a structure function derived from an experimental measurement.

The predetermined maximum temperature threshold may be a predetermined percentage of a maximum temperature change of the structure. The predetermined percentage of the maximum temperature change of the structure may be less than 2% of the maximum temperature change of the structure.

The thermal model elements and an order of the layers of the thermal model elements through which the heat flow passes may be identified by analyzing design data of the structure. The relation between transient thermal impedance of the structure and time may be represented by a $Z_{th}(t)$-curve (normalized transient thermal impedance function).

In another aspect, there are one or more non-transitory computer-readable media storing computer-executable instructions for causing one or more processors to perform the above method.

In still another aspect, there is a system comprising one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclose techniques. Thus, for example, those skilled in the art will recognize that the disclose techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the disclosed technology relate to techniques for mapping thermal model elements to a structure function based on a single simulation. In the following description, numerous details are set forth for the purpose of explanation. However, one of ordinary skill in the art will realize that the disclosed technology may be practiced without the use of these specific details. In other instances, well-known features have not been described in details to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of a computational fluid dynamics (CFD) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "determine", "perform" and "associate" to describe the disclosed methods. Such terms are high-level abstractions of the actual operations that are performed. The actual operations that correspond to these terms will vary depending on the particular implementation and are readily discernible by one of ordinary skill in the art.

Illustrative Operating Environment

Figure 1:
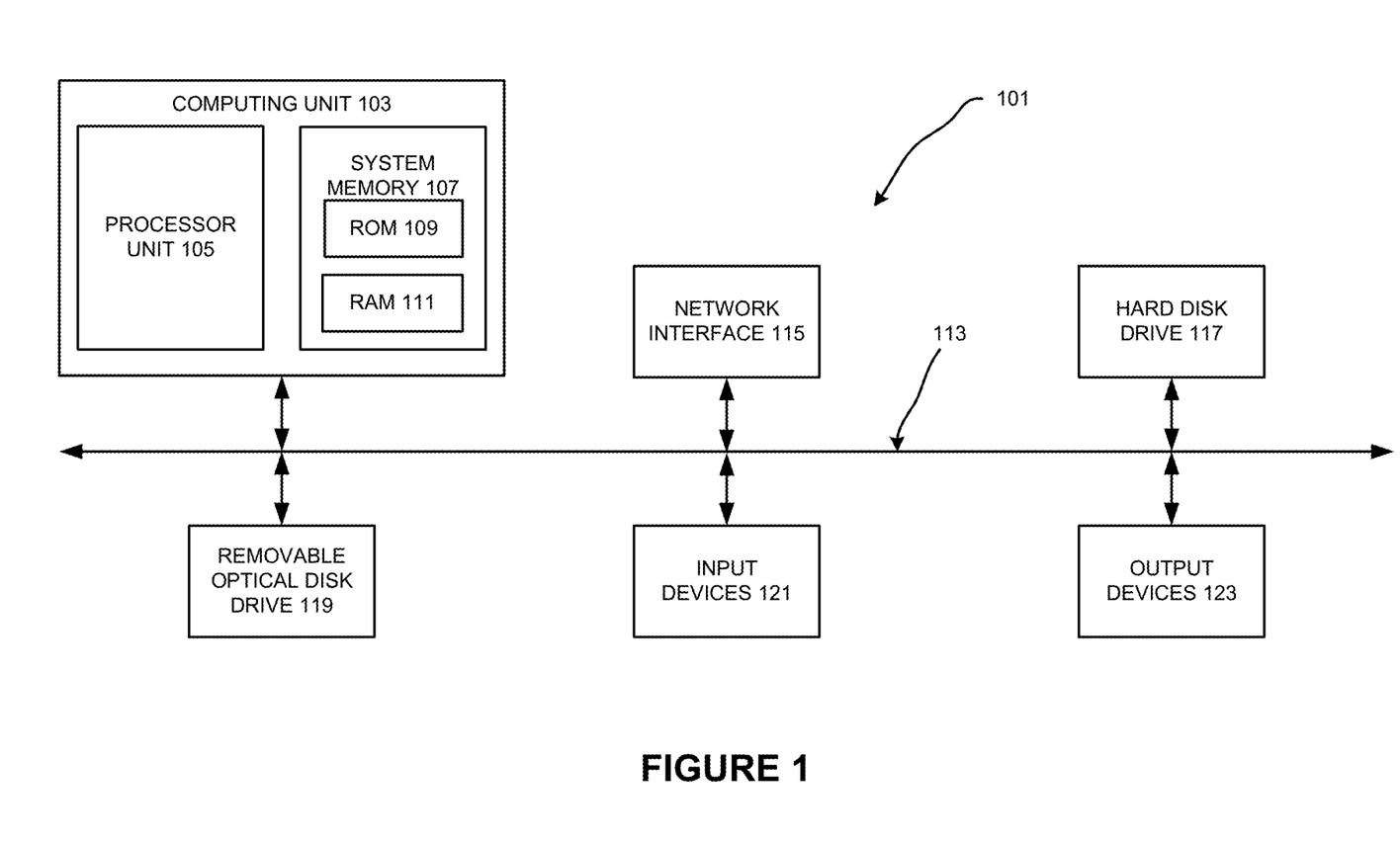
FIG. 1 illustrates an example of a programmable computer that may be used to implement a model calibration tool or method according to various embodiments of the disclosed technology.

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multiprocessor computer, a plurality of single and/or multiprocessor computers arranged into a network, or some combination of both.

Structure Function Analysis Tool

Figure 2:
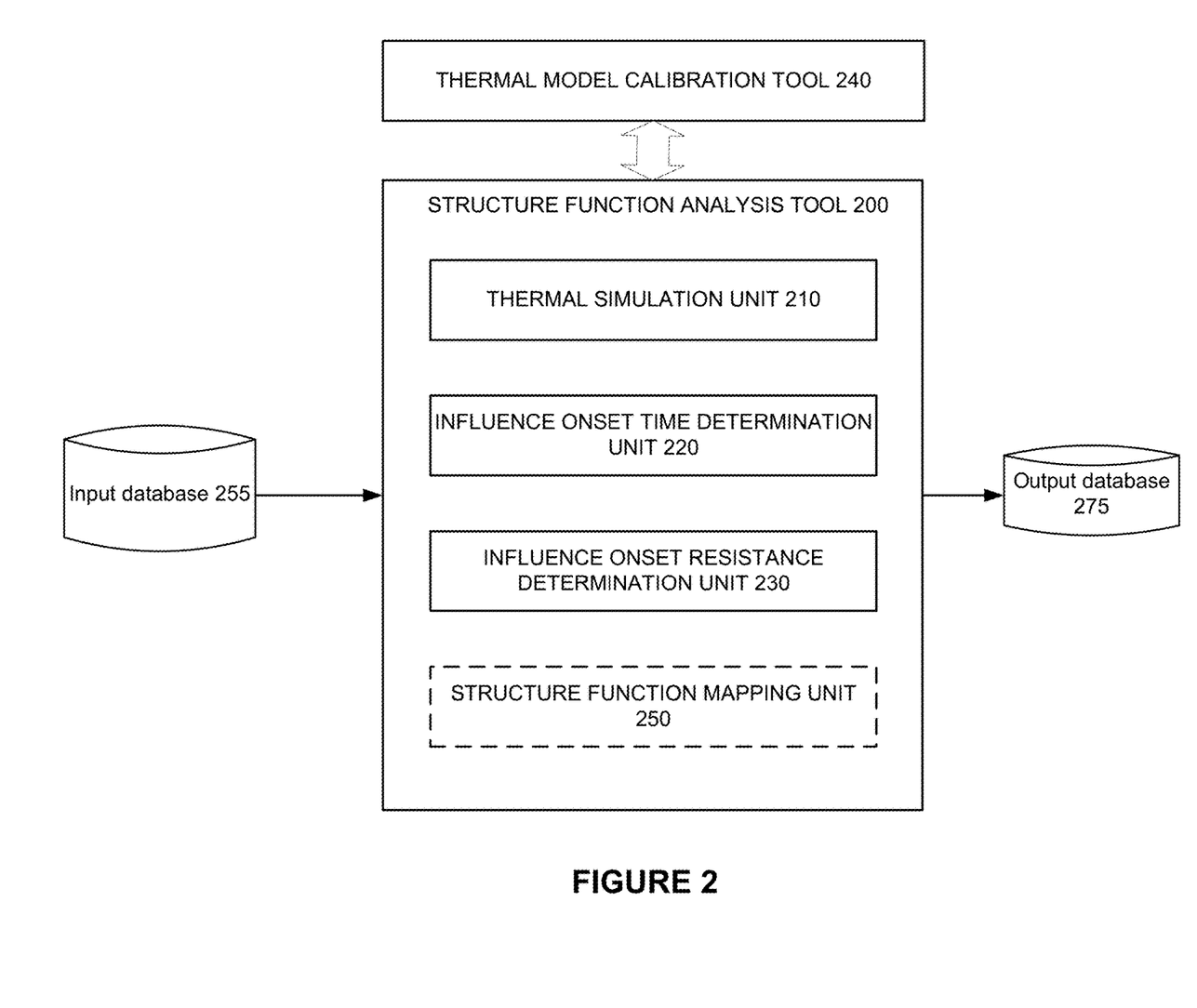
FIG. 2 illustrates a structure function analysis tool according to various embodiments of the disclosed technology.

FIG. 2 illustrates an example of a structure function analysis tool 200 according to various embodiments of the disclosed technology. As seen in this figure, the structure function analysis tool 200 includes a thermal simulation unit 210, an influence onset time determination unit 220, and an influence onset resistance determination unit 230. Some implementations of the model calibration tool 200 may cooperate with (or incorporate) one or more of a thermal model calibration tool 240, a structure function mapping unit 250, an input database 255 and an output database 275.

As will be discussed in more detail below, the thermal simulation unit 210 performs a thermal transient response simulation for a structure. The structure has a plurality of thermal model elements and a heat flow path in the structure passes through layers of the thermal model elements. The information of the structure including information of the thermal model elements and their order on the heat flow path may be received from the input database 255. This thermal transient response simulation determines a relation between transient thermal impedance of the structure and time and a relation between maximum temperature change of each of the thermal model elements and time. The relation between transient thermal impedance of the structure and time may be represented by a $Z_{th}(t)$-curve (normalized transient thermal impedance function).

The influence onset time determination unit 220 determines an onset time at which energy reaches each of the thermal model elements based on the relation between maximum temperature change of each of the thermal model elements and time and a predetermined threshold for maximum temperature change. The predetermined threshold for maximum temperature change may be set as a predetermined percentage of a final maximum temperature change of the structure. The influence onset resistance determination unit 230 determines an influence onset resistance value for each of the thermal model elements by looking up a thermal resistance value corresponding to the onset time based on the relation between transient thermal impedance of the structure and time. The influence onset resistance value for each of the thermal model elements may be outputted to the output database 275.

The structure function mapping unit 250 may associate portions of a structural function with the thermal model elements based on the influence onset resistance value for each of the thermal model elements. The structural function is also determined by the thermal transient response simulation. The model calibration tool 200 may calibrate a thermal model of the structure used by the thermal transient response simulation based on the influence onset resistance value for each of the thermal model elements and a structure function derived from an experimental measurement.

As previously noted, various examples of the disclosed technology may be implemented by a computing system, such as the computing system illustrated in FIG. 1. Accordingly, one or more of the thermal simulation unit 210, the influence onset time determination unit 220, the influence onset resistance determination unit 230, the structure function mapping unit 250, and the thermal model calibration tool 240 may be implemented by executing programming instructions on one or more processors in a computing system such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the thermal simulation unit 210, the influence onset time determination unit 220, the influence onset resistance determination unit 230, the structure function mapping unit 250, and the thermal model calibration tool 240. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

It also should be appreciated that, while the thermal simulation unit 210, the influence onset time determination unit 220, the influence onset resistance determination unit 230, the structure function mapping unit 250, and the thermal model calibration tool 240 are shown as separate units in FIG. 2, a single computer (or a single processor within a master computer) may be used to implement all or some of these units at different times, or components of these units/tool at different times.

With various examples of the disclosed technology, the input database 205 and the output database 285 may be implemented using any suitable computer readable storage device. That is, either of the input database 205 and the output database 285 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 255 and the output database 275 are shown as separate units in FIG. 2, a single data storage medium may be used to implement some or all of these databases.

Determination of Thermal Layer Contributions to Structure Function

Figure 3:
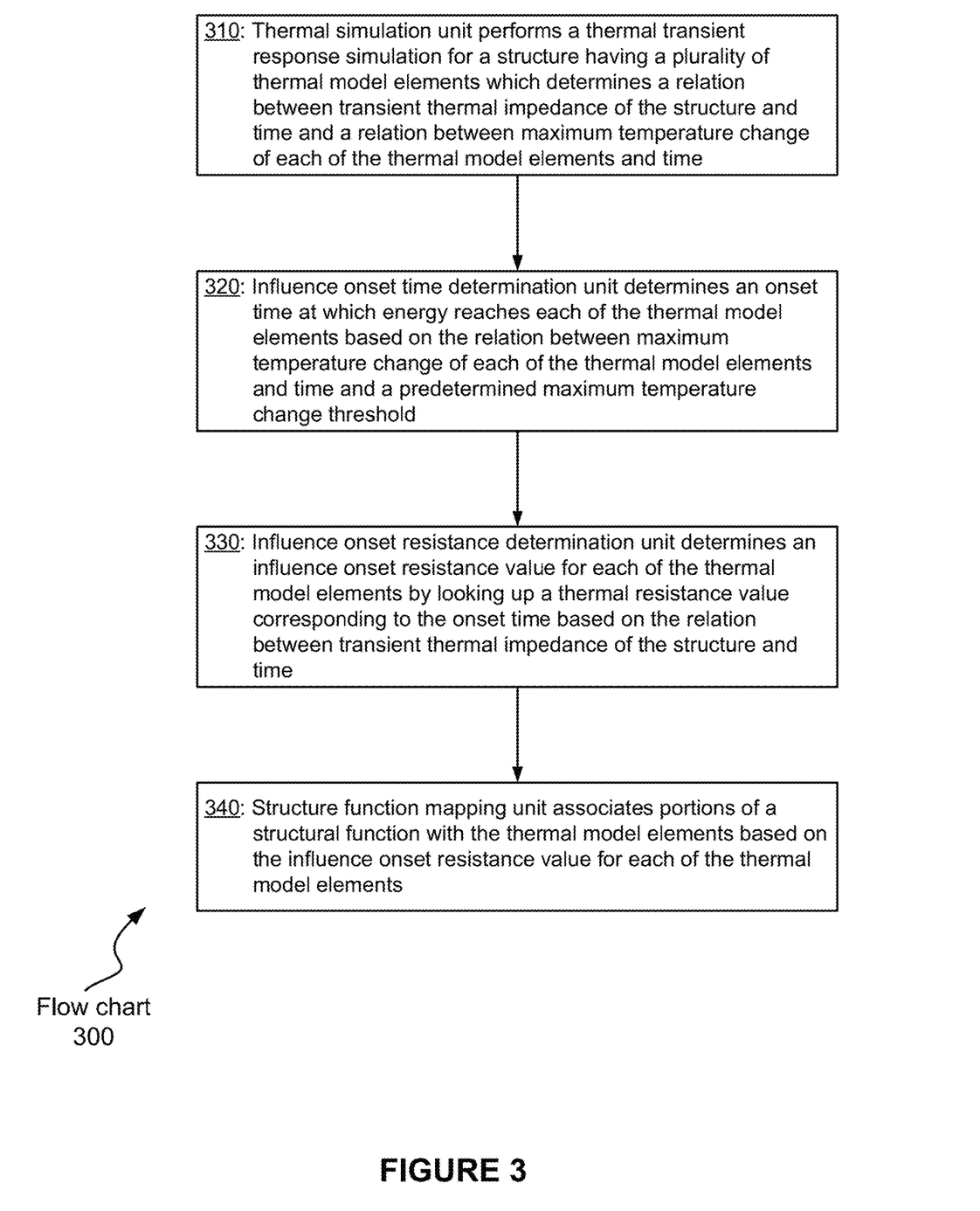
FIG. 3 illustrate a flowchart showing methods for single-simulation-based structure function mapping that may be implemented according to various examples of the disclosed technology.

FIG. 3 illustrates a flowchart 300 showing a process of single simulation-based structure function mapping that may be implemented according to various examples of the disclosed technology. For ease of understanding, methods of single simulation-based structure function mapping that may be employed according to various embodiments of the disclosed technology will be described with reference to the structure function analysis tool 200 illustrated in FIG. 2 and the flow chart 300 illustrated in FIG. 3. It should be appreciated, however, that alternate implementations of a structure function analysis tool may be used to perform the methods of single simulation-based structure function mapping illustrated by the flow chart 300 according to various embodiments of the disclosed technology. In addition, it should be appreciated that implementations of the structure function analysis tool 200 may be employed to implement methods of single simulation-based structure function mapping according to different embodiments of the disclosed technology other than the ones illustrated by the flow chart 300.

In operation 310 of the flowchart 300, the thermal simulation unit 210 performs a thermal transient response simulation for a structure having a plurality of thermal model elements. One example of the structure is an electronic package that mounts and interconnects of integrated circuits and other components onto printed-circuits boards. Another example of the structure is an integrated circuit package. The integrated circuit package includes an integrated circuit fabricated on a die. The package also includes parts for encapsulation or seal and heat dissipation.

A heat flow path that passes through layers of the thermal model elements in the structure and that carries the majority of heat may be determined using a software tool. One example of the software tool is the FloTHERM® family of software products available from Mentor Graphics Corporation of Wilsonville, Oreg. The thermal simulation unit 210 may also be implemented using the thermal simulation tool in the FloTHERM® family.

Figure 4:
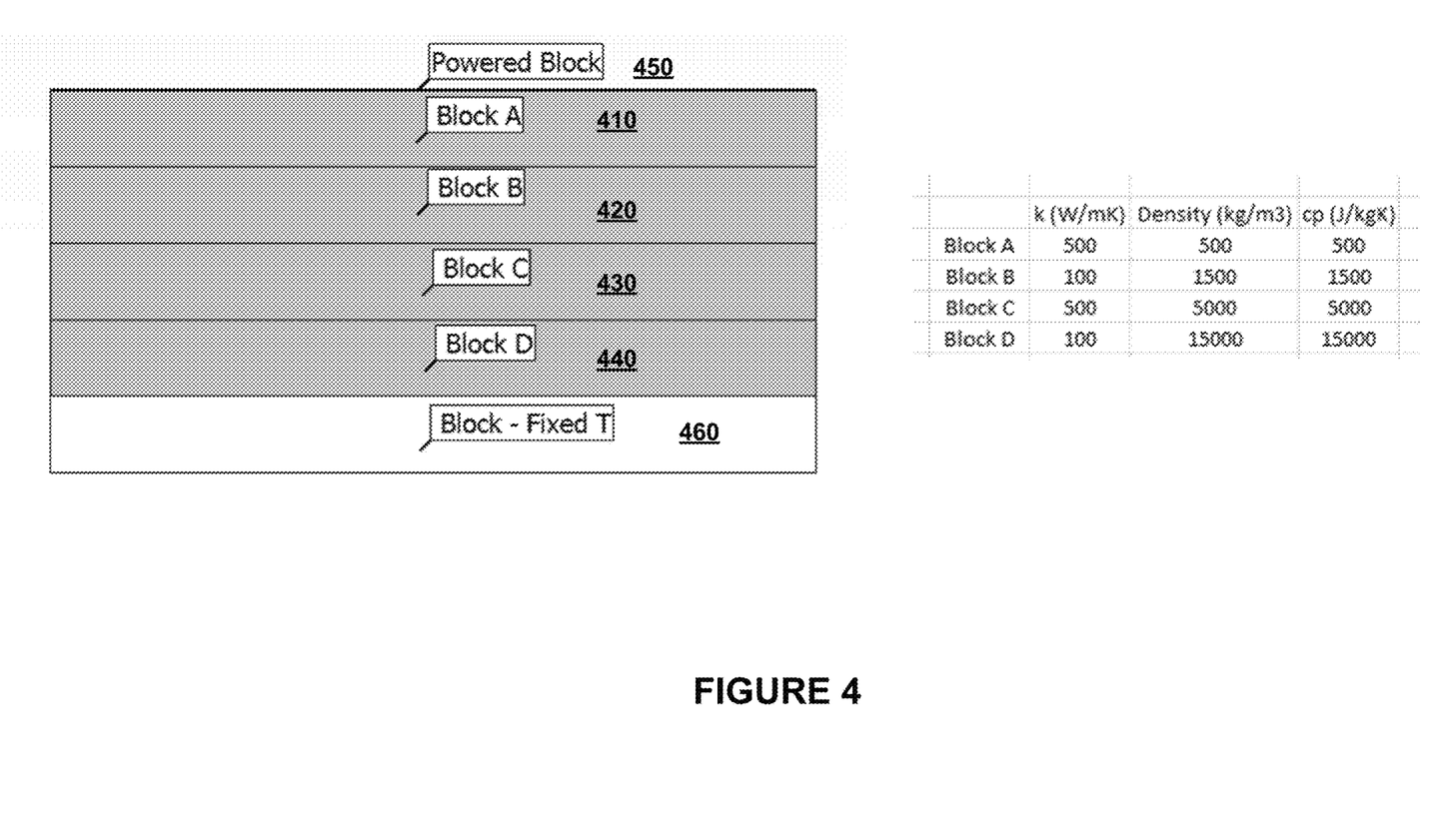
FIG. 4 illustrates an example of layers of thermal model elements of a structure through which an identified heat flow path passes.

FIG. 4 illustrates an example of layers of thermal model elements of a structure through which an identified heat flow path passes. The structure has four 10×10×1 mm cuboids 410-440 with various material properties which are listed in the table also shown in the figure. All boundaries are symmetric and the heat flow is one-dimensional. A power block 450 is a thin 10 W block while a bottom block 460 is a heat sink with the temperature being fixed at 0 degree C.

Figure 5:
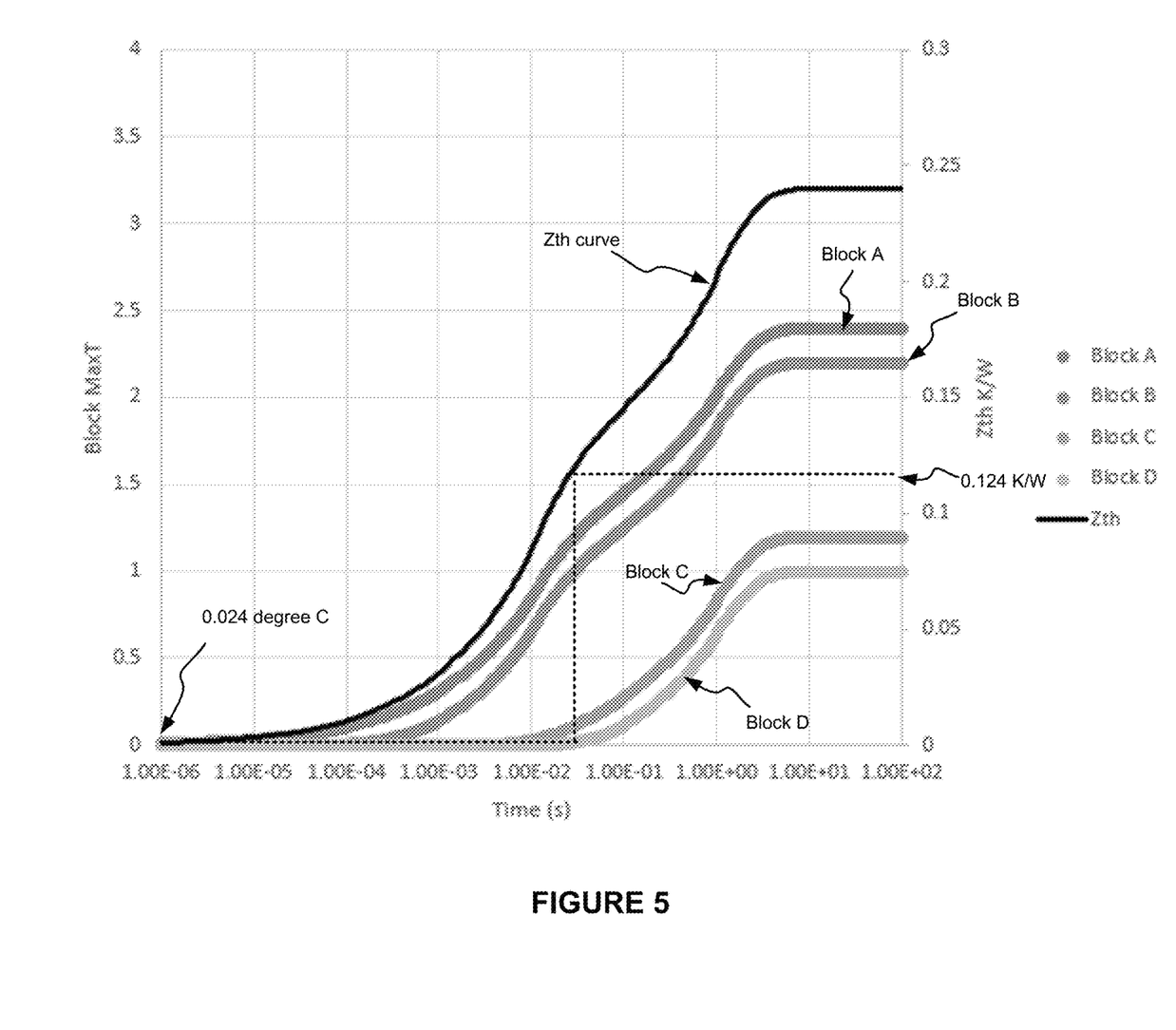
FIG. 5 illustrates a $Z_{th}(t)$-curve for the structure shown in FIG. 4 and four curves of maximum temperature changes vs time for the four thermal model elements 410-440 (blocks A-D).

The thermal transient response simulation performed by the thermal simulation unit 210 determines a relation between transient thermal impedance of the structure and time and a relation between maximum temperature change of each of the thermal model elements and time. As noted previously, the relation between transient thermal impedance of the structure and time can be represented by a $Z_{th}(t)$-curve (normalized transient thermal impedance function). FIG. 5 shows the $Z_{th}(t)$-curve for the structure shown in FIG. 4 and four curves of maximum temperature changes vs time for the four thermal model elements 410-440 (blocks A-D). Here, the vertical axis on the left is for the maximum temperature change and the one on the right is for the normalized transient thermal impedance.

In operation 320, the influence onset time determination unit 220 determines an onset time at which energy reaches each of the thermal model elements based on the relation between maximum temperature change of each of the thermal model elements and time and a predetermined threshold for maximum temperature change. The predetermined threshold for maximum temperature change may be set as a percentage of a final maximum temperature change of the structure. The percentage may be set at one percent. Here, it is assumed that the heat energy reaches a particular thermal model element layer when the maximum temperature rise of the particular thermal model element layer reaches one percent of a final maximum temperature change of the structure.

FIG. 5 illustrates how the onset time for the block D is determined. The final maximum temperature change of the structure is the final maximum temperature change of the block A, which is about 2.4 degree C. one percent of 2.4 degree C. is 0.024 degree C. The block D reaches 0.024 degree C. at about 0.05 second, which is the onset time for the block D.

In operation 330, the influence onset resistance determination unit 230 determines an influence onset resistance value for each of the thermal model elements by looking up a thermal resistance value corresponding to the onset time based on the relation between transient thermal impedance of the structure and time. Using the Zth curve, it is straightforward to determine the influence onset resistance value at the onset time. In FIG. 5, for example, the transient thermal resistance value at the onset time of 0.05 second is 0.124 K/W. Accordingly, the influence onset resistance value for the block D is 0.124 K/W.

Figure 6:
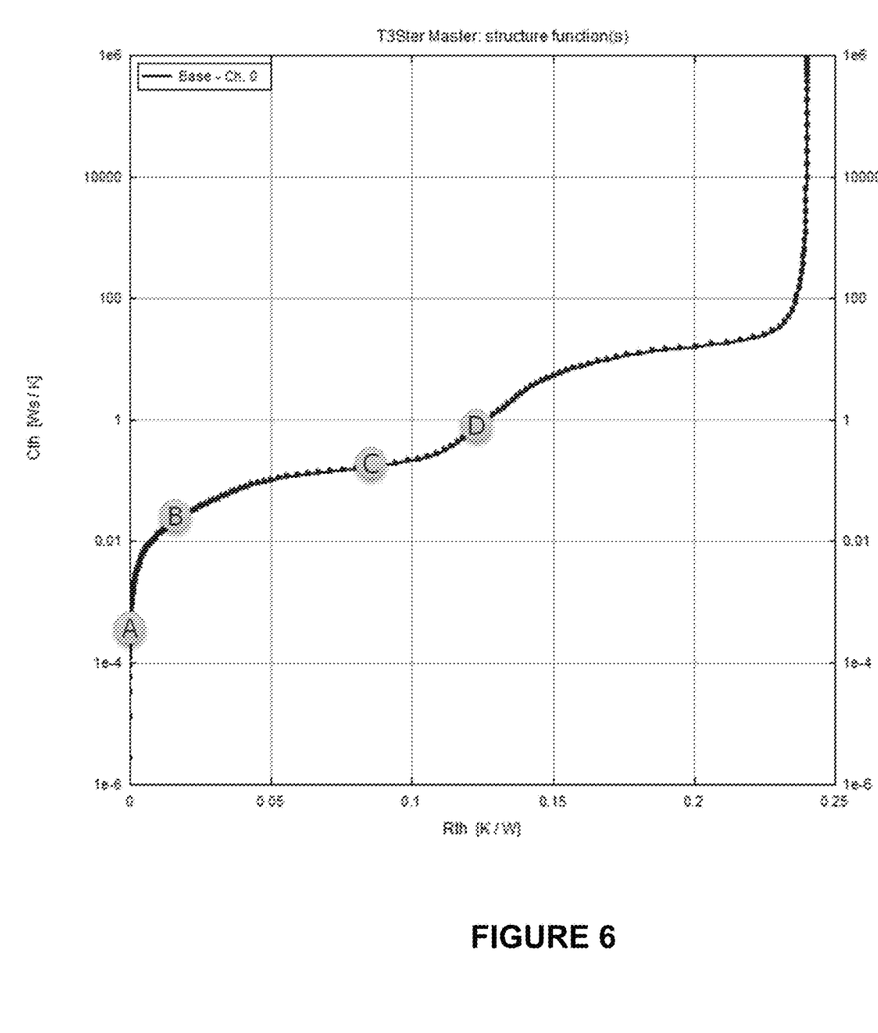
FIG. 6 illustrates a structure function for the structure shown in FIG. 4 with influence start points for the four thermal model elements 410-440 (blocks A-D).

In operation 340, the structure function mapping unit 250 associates portions of a structural function with the thermal model elements based on the thermal resistance values for the thermal model elements. The structural function can be determined by the thermal transient response simulation performed by the thermal simulation unit 210 in the operation 310. FIG. 6 illustrates a structure function for the structure shown in FIG. 4. On the curve, letters A-D indicate influence start points for the blocks A-D, respectively.

Figure 7:
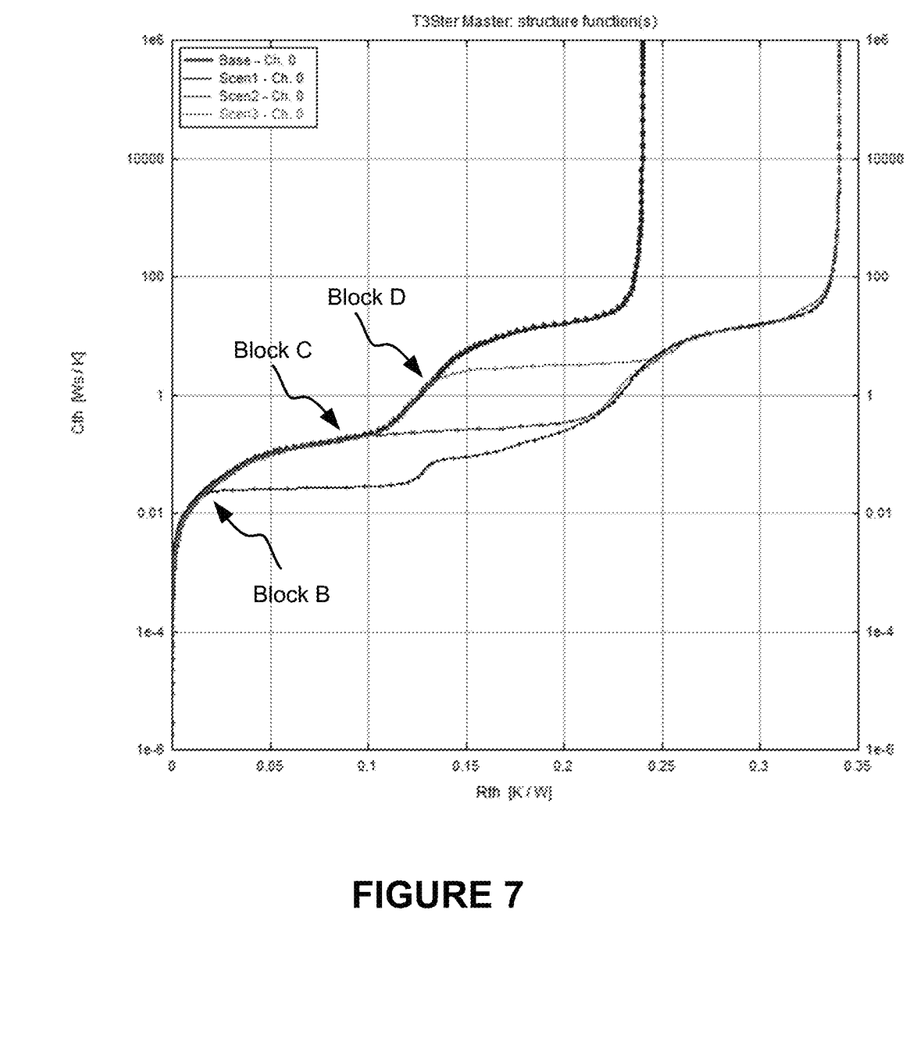
FIG. 7 illustrates an example of mapping a structure function based on the perturbation method.

The disclosed method can be validated by the conventional perturbation method. A two dimensional cuboid with thermal resistance of 0.1 K/W may be inserted just before the block of interest in terms of the heat flow path. In each case, a new structure function can be obtained and the resulting differences from the original structure function are shown in FIG. 7. These structure functions can be derived using the commercial T3Ster® system available from Mentor Graphics Corporation of Wilsonville, Oreg. The 1% threshold produced reasonable agreement with the perturbation method and default T3Ster Master TDIM settings.

Figure 8:
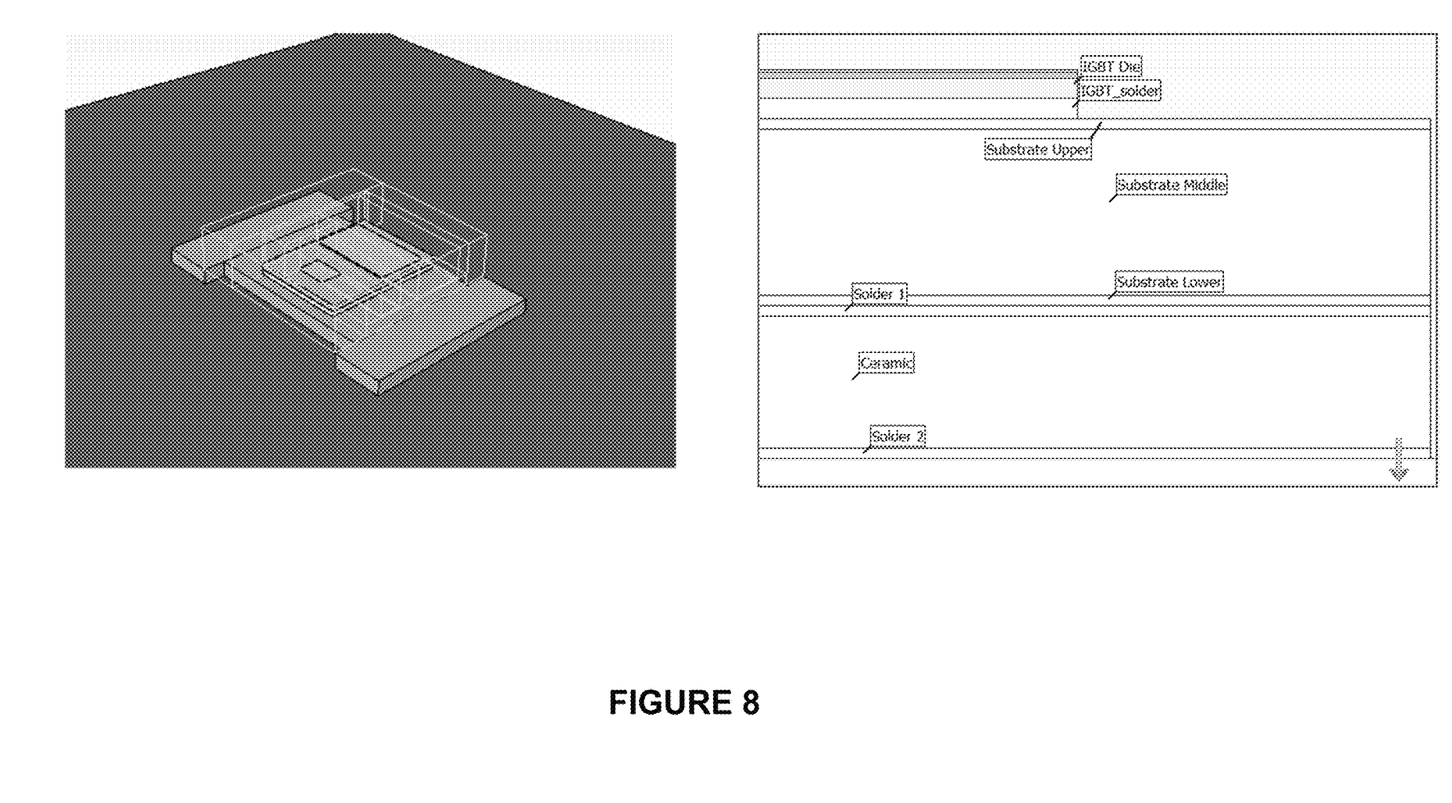
FIG. 8 illustrates another example of a structure, an insulated-gate bipolar transistor (IGBT).
Figure 9:
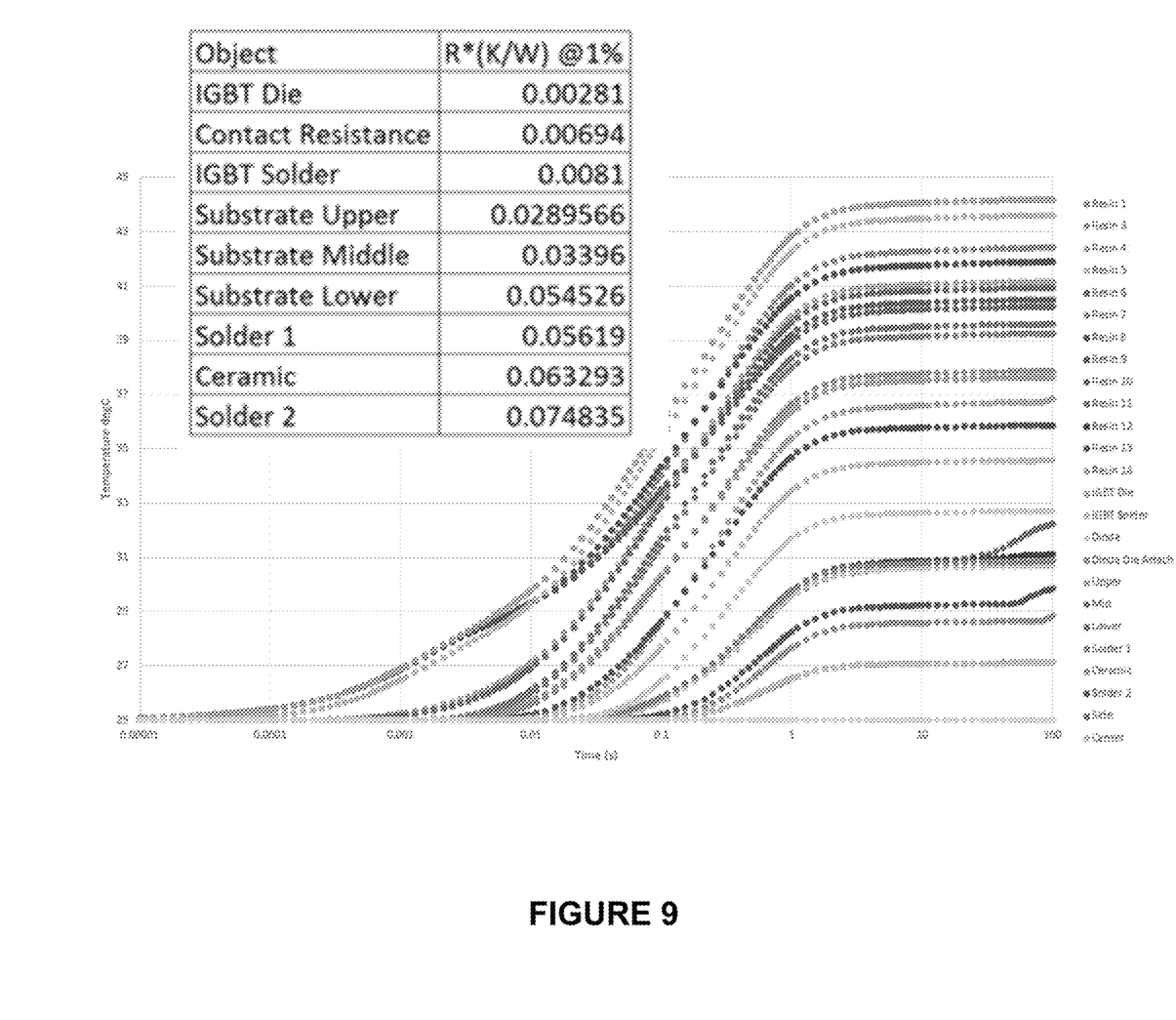
FIG. 9 illustrates maximum surface temperature tracked for all of the cuboids and influence onset resistance values for some of the cuboids (1% of steady state heat source dT of 17.7327 degree C. as the threshold).
Figure 10:
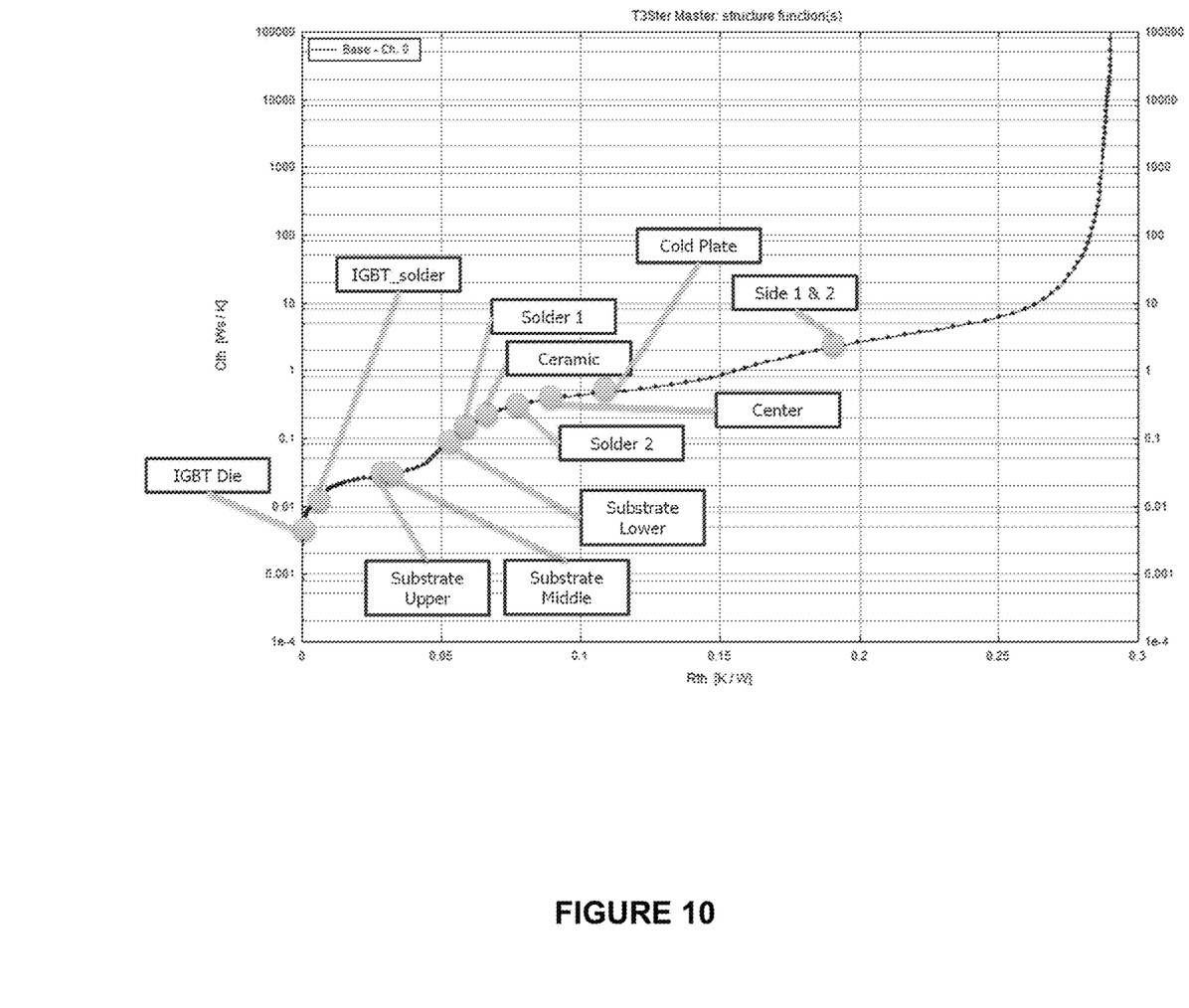
FIG. 10 illustrates a structure function for the structure shown in FIG. 8 with influence start points for some of the thermal model elements.

FIG. 8 shows another example of a structure, an insulated-gate bipolar transistor (IGBT). The heat flow is two-dimensional in this case. FIG. 9 shows maximum surface temperature tracked for all of the cuboids and influence onset resistance values for some of the cuboids using 1% of steady state heat source dT of 17.7327 degree C. as the threshold. FIG. 10 illustrates a mapped structure function.

Using the perturbation method or some other conventional methods, multiple simulations (up to a few hundreds) are needed, which can be computationally expensive. By contrast, the disclosed technology can map a structure function based on a single simulation.

In an optional operation, the thermal model calibration tool 240 can calibrate a thermal model of the structure used by the thermal transient response simulation based on analyzing the portions of the structural function. A structure function derived from simulating a detailed numerical model can be compared to an experimentally derived one. Deviations between experimental and numerical structure functions indicate error sites within the detailed model and whether the thermal resistances or thermal capacitances of the numerical model would need to be increased or decreased to match the experimentally observed values. The association of portions of the structural function with the thermal model elements allows to identify the thermal model element layers of which the model parameters need to be adjusted. Iterative modifications of the detailed model, based on successive structure function comparisons, can achieve a fully calibrated detailed numerical thermal model.

Conclusion

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic or mechanical computer-aided engineering design processes, it should be appreciated that various examples of the disclosed technology may be implemented using any desired combination of electronic or mechanical design processes.

What is claimed is:

1. A method, executed by at least one processor of a computer, comprising: performing a thermal transient response simulation for a structure having a plurality of thermal model elements, a heat flow path in the structure passing through layers of the thermal model elements, the thermal transient response simulation determining a relation between transient thermal impedance of the structure and time and a relation between maximum temperature change of each of the thermal model elements and time;
determining an onset time at which energy reaches each of the thermal model elements based on the relation between maximum temperature change of each of the thermal model elements and time and a predetermined maximum temperature change threshold; and
determining an influence onset resistance value for each of the thermal model elements by looking up a thermal resistance value corresponding to the onset time based on the relation between transient thermal impedance of the structure and time.

2. The method recited in claim 1, further comprising:
associating portions of a structural function with the thermal model elements based on the influence onset resistance value for each of the thermal model elements, the structural function being determined by the thermal transient response simulation.

3. The method recited in claim 1, further comprising:
calibrating a thermal model of the structure used by the thermal transient response simulation based on the influence onset resistance value for each of the thermal model elements and a structure function derived from an experimental measurement.

4. The method recited in claim 1, wherein the thermal model elements and an order of the layers of the thermal model elements through which the heat flow passes are identified by analyzing design data of the structure.

5. The method recited in claim 1, wherein the predetermined maximum temperature threshold is a predetermined percentage of a maximum temperature change of the structure.

6. The method recited in claim 5, wherein the predetermined percentage of the maximum temperature change of the structure is less than 2% of the maximum temperature change of the structure.

7. The method recited in claim 1, wherein the relation between transient thermal impedance of the structure and time is represented by a Zth(t)-curve (normalized transient thermal impedance function).

8. One or more non-transitory computer-readable media storing computer-executable instructions for causing one or more processors to perform a method, the method comprising:
performing a thermal transient response simulation for a structure having a plurality of thermal model elements, a heat flow path in the structure passing through layers of the thermal model elements, the thermal transient response simulation determining a relation between transient thermal impedance of the structure and time and a relation between maximum temperature change of each of the thermal model elements and time;
determining an onset time at which energy reaches each of the thermal model elements based on the relation between maximum temperature change of each of the thermal model elements and time and a predetermined maximum temperature change threshold; and
determining an influence onset resistance value for each of the thermal model elements by looking up a thermal resistance value corresponding to the onset time based on the relation between transient thermal impedance of the structure and time.

9. The one or more non-transitory computer-readable media recited in claim 8, wherein the method further comprises:
associating portions of a structural function with the thermal model elements based on the influence onset resistance value for each of the thermal model elements, the structural function being determined by the thermal transient response simulation.

10. The one or more non-transitory computer-readable media recited in claim 8, wherein the method further comprises:
   calibrating a thermal model of the structure used by the thermal transient response simulation based on the influence onset resistance value for each of the thermal model elements and a structure function derived from an experimental measurement.

11. The one or more non-transitory computer-readable media recited in claim 8, wherein the thermal model elements and an order of the layers of the thermal model elements through which the heat flow passes are identified by analyzing design data of the structure.

12. The one or more non-transitory computer readable media recited in claim 8, wherein the predetermined maximum temperature threshold is a predetermined percentage of a maximum temperature change of the structure.

13. The one or more non-transitory computer-readable media recited in claim 12, wherein the predetermined percentage of the maximum temperature change of the structure is less than 2% of the maximum temperature change of the structure.

14. The one or more non-transitory computer-readable media recited in claim 8, wherein the relation between transient thermal impedance of the structure and time is represented by a Zth(t)-curve (normalized transient thermal impedance function).

15. A system, comprising:
   one or more processors, the one or more processors programmed to perform a method, the method comprising:
   performing a thermal transient response simulation for a structure having a plurality of thermal model elements, a heat flow path in the structure passing through layers of the thermal model elements, the thermal transient response simulation determining a relation between transient thermal impedance of the structure and time and a relation between maximum temperature change of each of the thermal model elements and time;
   determining an onset time at which energy reaches each of the thermal model elements based on the relation between maximum temperature change of each of the thermal model elements and time and a predetermined maximum temperature change threshold; and
   determining an influence onset resistance value for each of the thermal model elements by looking up a thermal resistance value corresponding to the onset time based on the relation between transient thermal impedance of the structure and time.

16. The system recited in claim 15, wherein
the method further comprises:
associating portions of a structural function with the thermal model elements based on
the influence onset resistance value for each of the thermal model elements, the structural
function being determined by the thermal transient response simulation.

17. The system recited in claim 15 wherein
the method further comprises:
calibrating a thermal model of the structure used by the thermal transient response simulation based on the influence onset resistance value for each of the thermal model elements and a structure function derived from an experimental measurement.

18. The system recited in claim 15, wherein
the relation between transient thermal impedance of the structure and time is represented by a Zth(t)-curve (normalized transient thermal impedance function).

19. The system recited in claim 15, wherein
the predetermined maximum temperature threshold is a predetermined percentage of a maximum temperature change of the structure.

20. The system recited in claim 19, wherein
the predetermined percentage of the maximum temperature change of the structure is less than 2% of the maximum temperature change of the structure.

* * * * *